United States Patent
Takizawa et al.

(10) Patent No.: US 6,465,595 B1
(45) Date of Patent: Oct. 15, 2002

(54) POTENTIALLY HYDROPHILIC RESINS AND COMPOSITIONS COMPRISING THE SAME

(75) Inventors: Minoru Takizawa, Tokyo (JP); Hitoshi Naganuma, Tokyo (JP); Michiei Nakamura, Tokyo (JP); Naomi Oguma, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/523,949

(22) Filed: Mar. 13, 2000

(51) Int. Cl.[7] .............................................. C08F 120/06
(52) U.S. Cl. ................ 526/317.1; 526/319; 526/318.4; 526/320; 526/328.5; 526/328; 526/329.1; 526/210; 526/212; 524/504; 524/512; 524/533; 524/535; 524/536; 524/558; 427/407.1; 427/409
(58) Field of Search ................................ 526/319, 210, 526/212, 328, 328.5, 318.4, 329.7, 307.7, 317.1, 320, 329.1, 337; 524/504, 512, 533, 535, 556, 558; 427/407.1, 409

(56) References Cited

U.S. PATENT DOCUMENTS

| | | | |
|---|---|---|---|
| 4,257,935 A | * 3/1981 | Sekiguchi et al. | ......... 260/29.7 |
| 5,094,912 A | 3/1992 | Deibig et al. | ......... 428/355 AC |
| 5,104,955 A | * 4/1992 | Mathai | ..................... 526/323.2 |
| 5,763,528 A | * 6/1998 | Barsotti et al. | .......... 428/423.1 |
| 5,955,532 A | * 9/1999 | Chang et al. | ................ 524/504 |

FOREIGN PATENT DOCUMENTS

| | | | | |
|---|---|---|---|---|
| JP | 11229296 A | * | 8/1999 | .......... D21H/19/56 |

* cited by examiner

Primary Examiner—Tanya Zalukaeva
(74) Attorney, Agent, or Firm—Oblon, Spivak, McClelland, Maier & Neustadt, P.C.

(57) ABSTRACT

A potentially hydrophilic resin comprises at least monomer units readily saponifiable under alkaline conditions to form carboxyl groups, carboxyl-containing monomer units, and hydroxyl-containing monomer units. A potentially hydrophilic resin composition comprises, in a liquid medium, the potentially hydrophilic and an adhesive component or film-forming component. A recycling method is provided for an article with a coating applied on a surface thereof. According to the recycling method, the coating on the surface of the article is formed with the potentially hydrophilic resin composition, and subsequent to use of the article, the article is treated with alkaline water to saponify methyl acrylate in the coating such that the coating is caused to swell, and the coating so swollen is removed from the article.

18 Claims, No Drawings

POTENTIALLY HYDROPHILIC RESINS AND COMPOSITIONS COMPRISING THE SAME

BACKGROUND OF THE INVENTION a) Field of the Invention

This invention relates to potentially hydrophilic resins, compositions comprising the same, and methods of their use.

b) Description of the Related Art

In recent years, plastics are used as products such as containers and wrapping bags in a variety of fields. Many of these products are printed on their surfaces or are provided with sheet-shaped prints adhered on their surfaces. From the viewpoint of low degradability of plastic products in the natural world, resource saving, economy and the like, some of plastic products are recovered by segregation and separate collection and are recycled. However, inclusion of plastic products, which are applied with prints or the like, upon regeneration results in entire or localized coloring of recycled products. Accordingly, these recycled products are substantially reduced in commercial value or may not be reused in many instances. In some instances, detrimental drawbacks may arise in connection with physical properties of recycled products. These plastic products with prints or the like applied thereon as described above are, therefore, simply disposed as are or subjected to thermal or incineration disposal. Environmental contamination by dioxin and the like, which occur upon incineration, has however become a social problem, leading to a strong demand for an advantageous method which permits recovery and reuse of plastic products having prints or the like applied thereon.

With a view to meeting the above-mentioned demand, some methods have been proposed to decolor products, which are colored by prints or the like, upon recovering and reusing plastic products having prints or the like applied thereon. For example, JP 52-26549 B discloses a method, according to which a printed product is decolored by treating it with an organic solvent capable of causing dissolution or swelling of a printed coating applied on the product and separating (peeling) the printed coating from the product. In view of the need for separation and recovery of the organic solvent in liquid waste employed in the decoloration treatment, the danger of flammability of the organic solvent, and the like, the solvent-relying method involves many problems such as the need for the installation of an explosion-proof facility and a safety management. On the other hand, a method that involves treatment of a printed product with alkaline water is simple and economical, but the treatment with alkaline water cannot easily separate printed coatings because printed coatings are often formed with hydrophobic film-forming components such as urethane resins, acrylic resins, cellulose-base resins, rosin or ethylene-vinyl acetate copolymer.

A further method is discussed in JP 58-152913 B. According to this method, an alkaline-condition-soluble resin or a hydrophilic resin is added to a printing ink to be used for printing an article, and the article printed with the printing ink is treated with alkaline water to remove a printed coating from a surface of the article. This method is an excellent method making combined use of physical properties of the printing ink and its separability under alkaline conditions. Nonetheless, this method involves a problem in that the printing ink employed in it is applicable only in a narrow range. For example, the printing ink may undergo flocculation or thickening or may lead to prints reduced in luster and transparency and may hence lack properties appropriate as a printing ink, unless the alkali-condition-soluble resin is added by taking into consideration its compatibility with resin(s) in the printing ink.

Further, when the resin in a printing ink does not have elastic property, prints cannot be readily removed even if an attempt is made to separate them by adding an alkali-condition-soluble resin or a hydrophilic resin. Moreover, fragments so separated turn to fine fragments dispersed in the treatment solution, and for the recovery of such fine fragments so dispersed, use of a costly filter or the like is needed.

SUMMARY OF THE INVENTION

To solve the above-described problems of the conventional art, the present invention therefore has as objects thereof the provision of a potentially hydrophilic resin, which makes it possible to remove a coating printed on a plastic product or the like or a sheet-shaped print adhered on the product by treatment with alkaline water, to recover and regenerate the plastic product in a colorless form and further to readily separate the removed printed coating or sheet-shaped print from a treatment solution, a composition comprising the resin, and a method of use of the composition.

The above-described objects can be achieved by the present invention to be described hereinafter. Described specifically, the present invention provides a potentially hydrophilic resin (hereinafter simply called "the resin of the present invention") which comprises at least monomer units readily saponifiable under alkaline conditions to form carboxyl groups, carboxyl-containing monomer units, and hydroxyl-containing monomer units, a potentially hydrophilic resin composition (hereinafter simply called "the resin composition of the present invention") comprising the resin (specifically, a printing ink, an adhesive, a primer, or the like), and a method of use of the resin composition.

A printing ink comprising the resin of the present invention has various good properties as a printing ink, because it does not contain any water-soluble resin by itself. For the removal of a printed coating applied beforehand to an article with the printing ink, it is only necessary to simply treat the article with alkaline water. As a result, methyl acrylate units in the printed coating are readily saponified with the alkaline water so that the hydrophilicity of the resin making up the printed coating is increased. The printed coating is caused to swell and is readily allowed to separate from the surface of the article. Accordingly, the printed coating is neither dissolved in the alkaline water nor formed into fine fragments but is separated as a film. The printed coating so separated can be separated with ease from the alkaline water employed for its removal.

An adhesive comprising the resin of the present invention does not contain any water-soluble resin by itself so that, when a sheet-shaped print is adhered on an article with the adhesive, the sheet-shaped print has good durability against wetness, dew or the like. For the subsequent removal of the sheet-shaped print, it is only necessary to simply treat the article with alkaline water. As a result, methyl acrylate units in the adhesive coating are readily saponified with the alkaline water so that the hydrophilicity of the adhesive coating is increased. The adhesive coating is caused to swell, and the sheet-shaped print is allowed to readily separate from the surface of the article. Accordingly, the adhesive coating is neither dissolved in the alkaline water nor formed into fine fragments but separates together with the sheet-shaped print. The separated adhesive coating and sheet-shaped print can be separated with ease from the separating treatment solution.

When an article is provided on a surface thereof with a prime coat by using a primer, which comprises the resin of the present invention, and the prime coat is printed on a surface thereof or a sheet-shaped print is adhered on the surface of the prime coat, the print applied or adhered on the prime coat has good durability against wetness, dew or the like because the primer itself does not contain any water-soluble resin. For the subsequent removal of the printed coating or the sheet-shaped print, it is only necessary to simply treat the article with alkaline water. As a result, methyl acrylate units in the prime coat are readily saponified with the alkaline water so that the hydrophilicity of the resin making up the prime coat is increased. The prime coat is caused to swell, and the printed coating or the sheet-shaped print is allowed to readily separate together with the prime coat. Accordingly, the prime coat is neither dissolved in the alkaline water nor formed into fine fragments but separates together with the printed coating or the sheet-shaped print. The separated prime coat and printed coating or sheet-shaped print can be separated with ease from the separating treatment solution.

In the above-described three kinds of methods of use, employment of a resin physically or chemically crosslinked by the use of (a) a macromonomer or (b) a crosslinking agent upon production of the resin of the present invention or (c) formation of a coating such as a printed coating by combined use of a crosslinking agent upon formation of the coating or combined use of the above techniques (a) to (c) can promote the penetrability of alkaline water into a coating formed from the composition when the coating is brought into contact with the alkaline water. Therefore, separation of the above-described various coatings can be promoted further.

The potentially hydrophilic resin, composition and method of use according to the present invention, therefore, makes it possible to remove a coating printed on a plastic product or the like or a sheet-shaped print adhered on the product by treatment with alkaline water, to recover and regenerate the plastic product in a colorless form and further to readily separate the removed printed coating or sheet-shaped print from a treatment solution.

DETAILED DESCRIPTION OF THE INVENTION AND PREFERRED EMBODIMENTS

The present invention will next be described in further detail by preferred embodiments.

The resin of the present invention is characterized in that it comprises at least monomer units readily saponifiable under alkaline conditions to form carboxyl groups, carboxyl-containing monomer units, and hydroxyl-containing monomer units.

As a monomer readily saponifiable under alkaline conditions to form a carboxyl group, conventionally-known lower alkyl esters of polymerizable unsaturated carboxyl compounds are all usable although methyl acrylate is preferred for its excellent saponification rate under alkaline conditions. A description will hereinafter be made taking methyl acrylate as a representative example of the monomer readily saponifiable under alkaline conditions to form a carboxyl group.

As a carboxyl-containing monomer, conventionally-known polymerizable unsaturated carboxylic compounds are all usable although acrylic acid or methacrylic acid is preferred for its excellent copolymerizability with methyl acrylate. The description will hereinafter be made taking (meth)acrylic acid as a representative example of the carboxyl-containing monomer.

As a hydroxyl-containing monomer, conventionally-known hydroxyl-containing monomers are all usable. However, hydroxylalkyl (meth)acrylates excellent in the copolymerizability with methyl acrylate, for example, hydroxyalkyl (meth)acrylates which contain ethylene, propylene, butylene and the like as alkylene groups are preferred. The description will hereinafter be made taking hydroxylethyl (meth)acrylate as a representative example of the hydroxyl-containing monomer.

In preferred embodiments of the present invention, macromonomers are also used in combination with the above-described monomers. Conventionally-known macromonomers are all usable as macromonomers insofar as they contain polymerizable double bonds at terminals thereof. Preferred macromonomers can include, for example, macromonomers containing polymerizable groups at terminals of hydrophobic resins and having molecular weights of from 4,000 to 30,000 or so. Illustrative are polystyrene resins and polymethacrylate ester resins (the carbon numbers of ester residual groups: 1 to 17), which have polymerizable groups such a methacryloyl groups at terminals.

In the above description, the respective monomer units may preferably be in such weight proportions as described below when whole monomer units of the resin of the present invention are assumed to be 100 wt. %. Namely, methyl methacrylate may account for 20 to 90 wt. %, more preferably for 30 to 80 wt. %. (Meth)acrylic acid may account for 0.5 to 35 wt. %, more preferably for 1.0 to 20 wt. %. Hydroxyethyl (meth)acrylate may account for 0.5 to 35 wt. %, more preferably for 1.0 to 20 wt. %. Macromonomer units may account for 0 to 30 wt. %, more preferably for 1 to 20 wt. %. Other monomer component or components may account for 5 to 75 wt. %, more preferably for 5 to 50 wt. %.

Described generally, a content of methyl acrylate lower than 20 wt. % may result in a resin a coating of which, even when subjected to saponification treatment, cannot be rendered sufficiently hydrophilic so that its separability from an article is insufficient. A content of methyl acrylate higher than 90 wt. %, on the other hand, may lead to a resin a coating of which, after saponification, is provided with excessively high water-solubility so that penetration of alkaline water into the coating becomes slow and removal of the coating takes time. Contents of methyl acrylate outside the above range are therefore not preferred.

In general, a content of (meth)acrylic acid lower than 0.5 wt. % may result in a resin a coating of which is provided with sufficient hydrophilicity, so that substantial time is needed for the saponification treatment of methyl acrylate and separability of the coating is insufficient. A content of (meth)acrylic acid higher than 35 wt. %, on the other hand, may lead to a coating which is provided with excessively high water-solubility so that problems arise in various basic physical properties of the coating such as waterproofness.

Generally, a content of hydroxyethyl (meth)acrylate lower than 0.5 wt. % may result in a resin, a coating of which takes substantial time for the saponification treatment of methyl acrylate in the coating and has insufficient separability from an article. A content of hydroxyethyl (meth)acrylate higher than 35 wt. % may lead to unstable production of a resin and therefore, may not be practical. Upon production of the resin of the present invention in an aqueous system, hydroxyethyl (meth)acrylate acts as an emulsifier during polymerization, thereby making it possible to obtain a stable ultra-fine dispersion of the resin. When the resin of the present invention is produced in a non-aqueous system, the hydroxyethyl (meth)acrylate units serve as reaction sites for a crosslinking agent upon subsequently crosslinking a coating of the resin with the crosslinking agent.

When a macromonomer is used in combination with the above-described monomer components in the present invention, it may be used in a proportion of from 0.1 to 35 wt. %. A content of the macromonomer higher than 30 wt. % may result in a coating hydrophobicity of which is so high that penetration of water into the coating becomes slow, substantial time is needed for the saponification of methyl acrylate, and significant time is also needed for the removal of the coating. Contents of the macromonomer outside the above range are therefore not preferred. Further, upon production of the resin of the present invention in a non-aqueous system, the macromonomer contributes to the stabilization of a polymerization system, thereby making it possible to obtain the target resin in the form of a high concentration solution.

In the present invention, the total weight of methyl acrylate and (meth)acrylic acid in the resin of the present invention is usually important. When the proportions of the respective monomer units are assumed to fall within the above-described ranges, respectively, and the resin of the present invention is assumed to be 100 wt. %, this total weight may usually range from 25 to 95 wt. %, preferably from 30 to 80 wt. %. A total weight lower than 25 wt. % may result in a resin, which has insufficient hydrophilicity as a whole and provides a coating the separability of which is insufficient even after saponification treatment. A total weight higher than the above range, on the other hand, may lead to a resin, which has excessively high hydrophilicity as a whole. A coating of the resin is conversely inferior in removal rate, and moreover, the coating so removed turns to small fragments to lose its integrity as a removed coating or is dissolved, thereby making it difficult to separate the removed coating from the separating treatment solution.

In the resin of the present invention having the above-described monomer composition, one or more monomers other than those described above may be further copolymerized to control the performance of the resulting resin of the present invention. Examples of such monomers can include lower alkyl esters of (meth)acrylic acid other than methyl acrylate, such as methyl methacrylate, ethyl methacrylate, n-propyl (meth)acrylate, isobutyl (meth)acrylate and tert-butyl (meth)acrylate; dialkyl (C1–C5) maleates and monoalkyl (C1–C5) maleates; (meth)acryl-amides such as N,N'-dimethyl-(meth)acrylamide and N,N'-diethyl(meth) acrylamide; mono(meth)acrylates of polyethylene glycols having molecular weights of from 200 to 600; styrenes such as styrene and α-methylstyrene; and vinyl acetate and vinyl chloride. They can be used either singly or in combination and, when the sum of whole monomer units is assumed to be 100 wt. %, can be used in a proportion of from 0 to 50 wt. %, preferably from 10 to 35 wt. % based on the whole monomer units.

In the present invention, it is also possible to further copolymerize a polyfunctional vinyl monomer such that at least a part of the resin of the present invention is crosslinked to adjust the crosslink density of the resulting resin. The polyfunctional vinyl monomer may be added such that the content of polyfunctional vinyl monomer units accounts for 0 to 5 wt. %, preferably 0.1 to 3.5 wt. % of the whole resin. Use of such a polyfunctional vinyl monomer makes it possible to provide the resulting resin of the present invention with an increased crosslinking degree, thereby bringing about a further advantageous effect in addition to an advantageous effect available from the above-described macromonomer.

Illustrative of the polyfunctional vinyl monomer are divinylbenzene, ethylene glycol di(meth)acrylate, polyethylene glycol di(meth)acrylate, propylene glycol di(meth) acrylate, polypropylene glycol di(meth)acrylate, and tri- or tetra(meth)acrylates of polyhydric alcohols. Divinylbenzene is particularly preferred.

The resin of the present invention, which has the monomer composition described above, can be obtained by a conventionally-known polymerization process, for example, by copolymerizing the monomers by emulsion polymerization, soap-free polymerization, dispersion polymerization or the like. The resin of the present invention available as described above may preferably have a weight average molecular weight of from about 10,000 to 100,000, an acid value of from 8 to 250, and a hydroxyl value of from 4 to 140.

The resin composition of the present invention comprises the resin of the present invention as described above, an adhesive component or film-forming component, and a liquid medium in which these resin and component are dissolved or dispersed. Modes of its use can include, but are not limited to, adhesives, printing inks, primers and the like can be mentioned. In general, the resin composition of this invention may have solid contents of from 5 to 75 wt. % when the whole amount of the composition is assumed to be 100 wt. %. When the whole solids are assumed to be 100 wt. %, the potentially hydrophilic resin may account for 10 to 90 wt. %, preferably 20 to 80 wt. %, the adhesive component or film-forming component may amount for 1 to 85 wt. %, preferably 2 to 75 wt. %, and other component(s) may amount for 0.5 to 20 wt. %, preferably 1 to 15 wt. %.

Examples of the adhesive component or film-forming component can include protein, casein, starch and natural rubber; polyisoprene rubber, chloroprene rubber, butyl rubber, styrene-butadiene copolymer rubber, acrylonitrilebutadiene copolymer rubber, acrylic copolymers, vinyl acetate copolymers, vinyl chloride copolymers, ethylenevinyl acetate copolymers, polyurethanes, polyamides, poyesters, polyethylene and polypropylene and chlorinated products thereof, polyisobutyrene, polyvinyl butyral resin, silicone resins, coumarone resins, ketone resins, chlorinated rubber, and cyclized rubber.

Illustrative of the liquid medium, which is adapted to dissolve or disperse the resin of the present invention and the adhesive or film-forming component, are water, methanol, ethanol, isopropyl alcohol, methyl ethyl ketone, methyl isobutyl ketone, toluene, xylene, cyclohexanone, an mixtures thereof.

The above-described resin composition of the present invention can be formulated into printing inks by adding coloring materials similar to those employed in conventional printing inks. Further, addition of adhesive components can formulate it into adhesives. To use it as a primer, it is only necessary to use a suitable film-forming component as a primer component. In addition, plasticizers, such as dicyclohexyl phthalate, dioctyl phthalate, dibutyl phthalate and dibutyl adipate, and other additives can also be added.

A recycling method of the present invention for an article comprises printing or coating the article on a surface thereof with the resin composition of the present invention containing a coloring material (printing ink) and drying the resin composition, and subsequent to use of the article, treating the article, which carries the printed coating formed thereon, with alkaline water to saponify methyl acrylate in the printed coating such that the coating is provided with increased hydrophilicity and is caused to swell, and then removing the coating so swollen from the article.

Another recycling method of the present invention for an article comprises coating the article on a surface thereof with the resin composition of the present invention and drying the resin composition to form a coating, printing desired characters or pattern on a surface of the coating with a desired ink or adhering a sheet-shaped print to the surface of the coating, and subsequent to use of the article, treating the article with alkaline water to saponify methyl acrylate in the coating such that the coating is provided with increased hydrophilicity and is caused to swell, and then removing, from the article, the coating so swollen and the printed coating or sheet-shaped print.

In the above-described methods, it is preferable to achieve crosslinking with a crosslinking agent, which reacts with hydroxyl groups in the resin of the present invention, upon formation of a printed coating (in the case of a printing ink), an adhesive coating (in the case of an adhesive) or a prime coat (in the case of a primer). By such crosslinking, the coating or coat can be converted into a coating or coat having excellent durability against wetness or dew under ordinary conditions. Further, upon removal of the coating, the crosslinking promotes penetration of alkaline water into the coating and moreover, keeps the integrity of the coating after its removal, so that separation of the coating from the separating solution can be facilitated. Examples of such a crosslinking agent can include polyisocyanate compounds, polyepoxy compounds, amino resin, and glutaraldehyde.

Specific examples of the polyisocyanate compounds can include biurets of diisocyanates such as tolylene-diisocyanate (TDI), 4,4'-diphenylmethanediisocyanate (MDI), xylene-diisocyanate (XDI), hexamethylenediisocynate (HMDI) and isophoronediisocyanate (IPDI); adducts of the above-described diisocyanates with trimethylolpropane and the like; polyisocyanates such as trimers of diisocyanates; blocked polyisocyanates obtained by blocking polyisocyanates with alcohols (ethanol, isopropanol, n-butanol), phenol derivatives (phenol, nitrophenol), lactams (caprolactam) or active methylene compounds (diethyl malonate, methyl acetoacetate, ethyl acetoacetate, acetylacetone). In addition, carbodiimide crosslinking agents, which are available from the above-described isocyanates, and their derivatives can also be mentioned.

Illustrative of the polyepoxy compounds are triglycidyl isocyanurate, 3,4-epoxycyclohexylmethyl, and 3,4-epoxy-cyclohexanecarboxylate. Illustrative of the amino resins are dimethylol urea, methylol melamine, butylated methylol melamine. Besides, glutaraldehyde, silane coupling agents, tetraisopropyl titanate, acetyl acetotitanate, aluminum alcoholates, and aluminum chelates can also be mentioned.

Examples of the article to which the resin composition of the present invention is applied can include various plastic products such as containers and wrapping films, glass products, wooden products, and iron products. No particular limitation is imposed on the shapes of these articles. The print or coat amount may preferably range from 0.01 to 20 $\mu$m in terms of dry coat thickness. A print or coat amount smaller than 0.01 $\mu$m is difficult to achieve uniform printing or coating, while a print or coat amount greater than 20 $\mu$m is uneconomical and impractical.

The printing or coating of the resin composition of the present invention onto the surface of the article can be conducted by a conventional method, and no particular limitation is imposed on the printing or coating method. For example, gravure printing, letterpress printing (flexography), roll coating, reverse roll coating (transfer coating), spray coating or the like can be used. Formation of a resin coating and printing or the like may be conducted either as a continuous (in-line) system or as separate steps. No particular limitation is imposed on the printing or coating of an article in the present invention. Printing or coating can be effected directly onto a surface of an article, or can be effected onto a desired coating adhered on the surface of the article.

In the method of the present invention, removal of a coating of the resin composition of the present invention can be effected, for example, forming a plastic film, plastic container or the like, on which characters, a pattern and/or the like have been printed or adhered in accordance with the present invention, into small fragments by a shredder or the like as needed, dipping the plastic film, plastic container or the like or the small fragments thereof in alkaline water of low concentration to subject methyl acrylate units in the coating to saponification treatment, and allowing the coating to swell with the alkaline water. For example, a coating printed on an article or a sheet-shaped print adhered on an article can be removed preferably by placing the article in alkaline water and heating it to 70 to 80° C. under gentle stirring. It is preferred to remove a resin coating, a coating printed on the resin coating or a sheet-shaped print adhered on the resin coating by using alkaline water of caustic soda, sodium carbonate or the like as a saponifying agent and causing the resin coating to swell. Upon saponification, an organic solvent such as methanol or ethanol may be added to promote a saponification reaction.

The present invention will next be described more specifically by examples and comparative examples, in which designations of "part" or "parts" and "%" are on a weight basis unless otherwise specifically indicated.

SYNTHESIS EXAMPLE 1

Synthesis Example of Invention Resin A

Methyl acrylate (60 parts), butyl methacrylate (20 parts), acrylic acid (5 parts), 2-hydroxyethyl methacrylate (5 parts), polystyrene having polymerizable acryloyl groups at terminals (10 parts, molecular weight: about 6,000), ethyl acetate (210 parts), isopropyl alcohol (90 parts) and azobisisobutyronitrile (1.2 parts) were charged in a reaction vessel, and were then polymerized at 75° C. for 8 hours with stirring under a nitrogen gas atmosphere. The polymerization mixture was a dispersion of the ultrafine dispersion type, and its solid content was 25%. The resulting resin has a number average molecular weight of 20,000, an acid value of 38.9 and a hydroxyl value of 23.1.

Both before and after saponification treatment, the above resin of the present invention was analyzed by an infrared spectrophotometer and a gas chromatograph combined with a mass spectrometer. As a result, it was confirmed that methyl acrylate had been selectively saponified while butyl methacrylate had remained substantially undecomposed. In a similar manner as described above, invention resins (A-F, H) and comparative resins (I-J) were also synthesized in accordance with the corresponding monomer formulations described in Table 1.

SYNTHESIS EXAMPLE 2

Synthesis Example of Invention Resin G

Methyl acrylate (66.5 parts), ethyl methacrylate (22.1 parts), acrylic acid (6.7 parts) 2-hydroxyethyl methacrylate (3.3 parts), divinylbenzene (1.3 parts), sodium dodecylbenzenesulfonate (0.1 part), potassium persulfate (0.3 part) and deionized water (200 parts) were placed in a reaction vessel, and were then polymerized at 70° C. for 8 hours under a nitrogen gas atmosphere. After the polymerization, the polymerization mixture was adjusted to pH 8. After the resulting resin was dipped at room temperature for 1 hour in a 5% aqueous solution of caustic soda, the water swelling degree (deionized water) of the resin was 200 times (by volume ratio). In a similar manner as described above, a comparative resin (K) was also synthesized in accordance with the corresponding monomer formulation described in Table 1.

TABLE 1

Monomer formulations

| Resin | Monomer formulation | Monomer proportions (by weight) | Solid content (%) | Solvent |
|---|---|---|---|---|
| A | MA/BMA/AA/HEMA/MS | 60/20/5/5/10 | 25 | EtAc/iPA (7/3) |
| B | MA/St/AA/HEMA/MS | 50/20/10/15/5 | 50 | Tol/iPA (1/1) |
| C | MA/St/NMA/AA/HEMA/MS | 35/15/15/15/5/15 | 45 | Tol/ipa (1/1) |
| D | MA/St/AA/HEMA/MS | 70/5/10/10/5 | 25 | MEK |
| E | MA/BMA/AA/HEMA/MS/DVB | 45/10/20/10/15/1.5 | 45 | MEK |
| F | MA/iBA/AA/HEMA/MS | 5O/20/10/15/5 | 45 | Tol/iPA (1/1) |
| G | MA/EMA/AA/HEMA/DVB | 66.5/22.1/6.7/3.3/1.3 | 30 | Water system |
| H | MA/BMA/AA/HEMA | 45/20/30/5 | 45 | Tol/iPA (1/1) |
| I | BA/nDA | 70/30 | 45 | Tol/iPA (1/1) |
| J | St/AA | 70/30 | 45 | Tol/iPA (1/1) |
| K | St/nDA/BA | 30/30/40 | 50 | Water system |

(Note)
MA: methyl acrylate, BMA: butyl methacrylate, AA: acrylic acid, HEMA: hydroxyethyl methacrylate, MS: polystyrene containing acryloyl groups at terminals (molecular weigh: 6,000), MMA: methyl methacrylate, EMA: ethyl methacrylate, BMA: butyl methacrylate, St: styrene, iBMA: isobutyl methacrylate, BT: butyl acrylate, nDA: n-dodecyl acrylate, DVB: divinylbenzene, EtAc: ethyl acetate, IPA: isopropyl alcohol, Tol: toluene, MEK: methyl ethyl ketone.

TABLE 2

Physical Properties of Resultant Invention Resins

| Resin | Weight average molecular weight | Acid value, mg (KOH)/g | Hydroxyl value, mg (KOH)/g |
|---|---|---|---|
| A | 20,000 | 38.9 | 23.1 |
| B | 30,000 | 77.8 | 34.6 |
| C | 25,000 | 84.9 | 11.6 |
| D | 20,000 | 77.8 | 34.6 |
| E | Measurement infeasible | 155.6 | 34.6 |
| E | 30,000 | 77.8 | 34.6 |
| G | Measurement infeasible | 52.1 | 15.2 |
| H | 25,000 | 233.3 | 11.6 |
| I | 30,000 | 0 | 0 |
| J | 20,000 | 233.3 | 0 |
| K | 70,000 | 0 | 0 |

EXAMPLE 1 & COMPARATIVE EXAMPLE 1

Prepared was a gravure printing ink, which was composed of an azo pigment (10 parts), an acrylic copolymer (primary monomer: butyl methacrylate, 12 parts), a cellulose-base resin (3 parts), a polyethylene-base wax (2 parts), isopropyl alcohol (27 parts), propyl acetate (27 parts) and ethyl acetate (6.5 parts) (this ink was used as Comparative Example 1). Printing inks according to the present invention were also prepared by using the following resin components (15 parts) instead of the resin component (15 parts) in the above ink.

| Example 1-1 | Above-described acrylic copolymer | 6 parts |
|---|---|---|
| | Cellulose-base resin | 1.5 part |
| | Invention resin A | 12.2 parts |
| Example 1-2 | Above-described acrylic copolymer | 7.5 parts |
| | Cellulose-base resin | 1.5 part |
| | Invention resin B | 7.5 parts |
| Example 1-3 | Above-described acrylic copolymer | 6 parts |
| | Cellulose-base resin | 1.5 part |
| | Invention resin C | 7.5 parts |
| Example 1-4 | Above-described acrylic copolymer | 6 parts |
| | Cellulose-base resin | 1.5 part |
| | Invention resin D | 7.5 parts |
| Example 1-5 | Above-described acrylic copolymer | 6 parts |
| | Cellulose-base resin | 1.5 part |
| | Invention resin E | 7.5 parts |

EXAMPLE 2 & COMPARATIVE EXAMPLE 2

Prepared was a gravure printing ink, which was composed of a titanium oxide pigment (32 parts), a urethane resin (23 parts), a cellulose-base resin (1 part), rosin (0.4 part), a polyethylene-base wax (0.5 part), toluene (26 parts), MEK (14.5 parts), ethyl acetate (8.4 parts) and isopropyl alcohol (7 parts) (this ink was used as Comparative Example 2-1). Printing inks according to the present invention were also prepared by using the following resin components (24.4 parts) instead of the resin component (24.4 parts) in the above ink.

| Example 2-1 | Above-described urethane resin | 11.5 parts |
|---|---|---|
| | Cellulose-base resin | 0.5 part |
| | Rosin | 0.2 part |
| | Invention resin A | 12.2 parts |
| Example 2-2 | Above-described urethane resin | 11.5 parts |
| | Cellulose-base resin | 0.5 part |
| | Rosin | 0.2 part |
| | Invention resin B | 12.2 parts |
| Example 2-3 | Above-described urethane resin | 11.5 parts |
| | Cellulose-base resin | 0.5 part |
| | Rosin | 0.2 part |
| | Invention resin C | 12.2 parts |
| Example 2-4 | Above-described urethane resin | 11.5 parts |
| | Cellulose-base resin | 0.5 part |
| | Rosin | 0.2 part |
| | Invention resin D | 12.2 parts |
| | Butylated melamine | 12.2 parts |
| Example 2-5 | Above-described urethane resin | 11.5 parts |
| | Cellulose-base resin | 0.5 part |
| | Rosin | 0.2 part |
| | Invention resin E | 12.2 parts |
| Comp. Ex. 2-2 | Above-described urethane resin | 11.5 parts |
| | Cellulose-base resin | 0.5 part |
| | Rosin | 0.2 part |
| | Comparative resin J | 12.2 parts |

Using the above inks, printed coatings were formed as will be described below. Those printed coatings were tested for separability, waterproofness and adhesiveness.

Formation of Printed Coatings

The individual inks were separately coated by a bar coater #4 onto PET films ("SC00", trade name; product of Toyobo Co., Ltd.; thickness: 450 $\mu$m) to give a dry coat thickness in a range of from 1 to 3 $\mu$m, and were then dried at 80° C. for 10 minutes (in Example 2–4, however, baking processing was conducted at 150° C. for 30 seconds).

Testing Method (1) Separability Test

Printed films were dipped in a 1.5% aqueous solution of NaOH, which was controlled at 85° C. After passage of predetermined time periods, they were successively taken out of the solution and rinsed with water under gentle stirring. The state of separation of each printed coating was observed. Test results are shown in Table 3. The ranking in the table was made in accordance with the following ranking standard.

A: A printed coating separated completely, and the PET film was substantially the same as the PET film before the printing.

B: A printed coating partly remained on the PET film.

C: A printed coating fully remained on the PET film.

(2) Waterproofness Test

After each printed film was dipped for 30 minutes in deionized water of 85° C. instead of the alkaline treatment solution, an observation was made as to whether or not the printed coating had separated.

(3) Adhesiveness

Before the separability test, each printed film was confirmed by the cellophane tape peel test that the printed coating did not separate.

TABLE 3

Results of the separability test (1)

| Ink | Dipping time (min) | | |
|---|---|---|---|
| | 5 | 15 | 30 |
| Example 1-1 | A | A | A |
| Example 1-2 | B | A | A |
| Example 1-3 | A | A | A |
| Example 1-4 | A | A | A |
| Example 1-5 | C | B | A |
| Comparative Example 1 | C | C | C |
| Example 2-1 | B | A | A |
| Example 2-2 | B | A | A |
| Example 2-3 | C | B | A |
| Example 2-4 | A | A | A |
| Example 2-5 | A | A | A |
| Comparative Example 2-1 | C | C | C |
| Comparative Example 2-2 | C | C | C |

(2) Results of the waterproofness test

In all the examples, the printed coatings did not separate.

(3) Results of the Adhesiveness Test

In all the examples, the printed coatings did not separate.

EXAMPLE 3 & COMPARATIVE EXAMPLE 3

Adhesive X

A hot-tack adhesive (solid content: 50%) prepared by mixing the above-described resin K, glycerol tribenzoate and trimethylpropane tribenzoate at a solid weight ratio of 1.2/1.0/1.0.

Adhesive Y

The above-described resin I was used.

Each adhesive composition shown below in Table 4 was coated on a paper-made label, on which aluminum had been vapor-deposited, to give a dry coat thickness of about 10 $\mu$m, and was then dried. The paper-made label with the adhesive composition applied thereon was then adhered at 100° C. to a polyethylene terephthalate sheet (PET) by thermocompression bonding. To the adhesive composition for use with a glass plate, glutaradehyde and as a catalyst, paratoluenesulfonic acid were added and mixed in proportions of 1% and 0.5%, respectively, based on solid contents of the adhesive composition. In a similar manner as described above, the resulting adhesive composition was coated on a similar paper-made label and was then dried. The paper-made label was then baked at 150° C. for 30 seconds onto the glass plate. The base materials so adhered with the paper-made labels were investigated for the below-described properties. The results shown below in Table 4 were obtained.

Adhesiveness

A: Exhibited.

B: Not exhibited.

Separability

Each adhered sample was dipped at 70° C. in a 5% aqueous solution of caustic soda, and the time required until separation of the label from the base material was measured (min).

Remaining Tendency of Adhesive Coating on the Base Material after Separation of the Label Each base material, subsequent to removal of its adhesive coating and label, was washed for 10 seconds in running water, and was then ranked.

A: Adhesive coating was completely peeled off.

B: About half the adhesive coating remained.

C: The adhesive coating remained fully.

TABLE 4

| Example | Adhesive composition Resin A/Adhesive X (Solid content weight proportion) | Adhesiveness | | Time until separation (min) | | Remaining tendency of adhesive | |
|---|---|---|---|---|---|---|---|
| | | PET | Glass | PET | Glass | PET | Glass |
| Comp. Ex. 3 | 0/100 | A | A | 60 | 60 | C | C |
| Example 3-1 | 10/90 | A | A | 15 | 15 | A | A |
| Example 3-2 | 15/85 | A | A | 3 | 5 | A | A |
| Example 3-3 | 30/70 | A | A | 1 | 1 | A | A |

EXAMPLE 4 & COMPARATIVE EXAMPLE 4

Setting the resin A,D-G,J/the adhesive X or Y constant at 40/60 (weight proportions), invention and comparative adhesive compositions were formulated by combining the individual resins and adhesive components. Ranking was conducted as in Example 3, and the results shown below in Table 5 were obtained.

TABLE 5

| Example | Resin/Adhesive | Adhesiveness PET | Adhesiveness Glass | Time until separation (min) PET | Time until separation (min) Glass | Remaining tendency of adhesive PET | Remaining tendency of adhesive Glass |
|---|---|---|---|---|---|---|---|
| Example 4-1 | G/X | A | A | 12 | 10 | A | A |
| Example 4-2 | A/Y | A | A | 5 | 3 | A | A |
| Example 4-3 | D/Y | A | A | 5 | 3 | A | A |
| Example 4-4 | E/Y | A | A | 5 | 2 | A | A |
| Example 4-5 | F/Y | A | A | 15 | 10 | A | A |
| Comp. Ex. 4 | J/Y | A | A | 60 | 60 | B–C | C |

Incidentally, to the resin D, a polyisocyanate adduct (crosslinking agent) was added in a proportion of 0.5% based on solid contents.

From Table 5, it has been found that use of the resin J the swellability of which is low cannot obtain sufficient results in connection with the time until separation and the remaining tendency of the adhesive.

EXAMPLE 5 & COMPARATIVE EXAMPLE 5

Prime coats making use of the resins A-E,I-J described in Table 1 were coated on surfaces of plastic films (thickness: 25 μm) described in Table 6, respectively, and were then coated on surfaces thereof with a printing ink to be described subsequently herein.

(1) Formation of Prime Coats

Ultra-fine dispersion-type solutions of the respective resins A-E,I-J were coated on the corresponding plastic films described in Table 6 to give a dry coat thickness of about 5 μm, and were then dried at 80° C. for 5 minutes. Incidentally, the individual plastic films described in Table 6 are as follows:

HDPE: high-density polyethylene
PET: treated PET (polyethylene terephthalate)
S-PET: shrinkable PET
S-PS: shrinkable PS (polystyrene)
OPP: Biaxially-oriented polypropylene (2) Preparation of Ink An ink composed of Cyanine Blue (10 parts), a polyamide (15 parts), pyroxylin (3 parts), additives (10 parts) and a solvent (toluene/isopropyl alcohol/ethyl acetate, 62 parts) was prepared by a method known per se in the art.

(3) Printing onto the Prime Coats

The above ink was coated on a surface of each prime coat to give a dry coat thickness of about 5 μm. Where no prime coat was applied, the ink was coated on the plastic film to give a dry coat thickness of about 5 μm.

With respect to the ink-coated plastic films obtained as described above, separability, waterproofness and adhesiveness were tested. The following testing methods were followed. Test results are shown in Tables 6 and 7.

(1) Separability Test

Printed films were dipped in a 1.5% aqueous solution of NaOH, which was controlled at 85° C. Under gentle stirring, the state of separation of each printed coating was observed.

A dipping time (min)—which was required for each film until the printed coating separated almost completely in 40 minutes by itself (in other words, naturally during dipping without taking the film out of the solution after dipping and then applying external force, for example, exposing the printed coating to running water or rubbing the printed coating)—is shown. When self-separation did not take place, the following indication was made.

C: The prime coat and the printed coat remained completely, and did not separate even when rubbed.

(2) Waterproofness Test

After each printed film was dipped for 30 minutes in deionized water controlled at 85° C., an observation was made as to whether or not the printed coating had separated. The result was ranked as follows:

A: The prime coat did not separate even when exposed to running water.

B: The prime coat separated by itself or when exposed to running water.

(3) Adhesiveness Test

Before the separability test, each printed film was confirmed by the cellophane tape peel test that the printed coating did not separate. As an alternative, the test was conducted after confirming that the printed coat had similar separability as inks employed generally.

TABLE 6

| | Example 5 | | | | | | | | | | |
|---|---|---|---|---|---|---|---|---|---|---|---|
| | 1 | 2 | 3 | 4 | 5 | 6 | 7 | 8 | 9 | 10 | 11 |
| Resin of prime coat | A | A | A | B | B | B | D | D | D | C | E |
| Film | PET | OPP | HDPE | PET | OPP | HDPE | PET | OPP | HDPE | PET | PET |
| Separability | 1 | 1 | 1 | 7 | 7 | 7 | 2 | 1 | 3 | 20 | 10 |
| Waterproofness | A | A | A | A | A | A | A | A | A | A | A |

| | Example 5 | | | Comparative Example 5 | | | | | |
|---|---|---|---|---|---|---|---|---|---|
| | 12 | 13 | 14 | 1 | 2 | 3 | 4 | 5 | 6 |
| Resin of prime coat | H | H | H | I | I | I | J | J | None |
| Film | PET | OPP | HDPE | PET | OPP | HDPE | PET | OPP | PET |
| Separability | 30 | 30 | 30 | C | C | C | 120 | 120 | C |
| Waterproofness | A | A | A | A | A | A | B | B | A |

Note:
Resins B and D were each added with 0.5% of a poly-isocyanate adduct (crosslinking agent) based on solid contents.

What is claimed is:

1. A resin, comprising:
   a) at least one monomer unit saponifiable under alkaline conditions to form at least one unit selected from the group consisting of a carboxyl group, a carboxyl-containing monomer unit, a hydroxyl-containing monomer unit and a mixture thereof; and
   b) 0.5 to 35 wt. % of a macromonomer unit which is a component selected from the group consisting of A) a polyester resin having at least two polymerizable groups at its terminals, B) a polymethacrylate resin having at least two polymerizable groups at its terminals or C) a polystryrene having at least two polymerizable acryloyl groups at its terminals;
   wherein a total amount of monomer units is 100 wt. %.

2. The resin according to claim 1, wherein said monomer unit readily saponifiable under alkaline conditions to form said carboxyl group is a methyl acrylate unit, said carboxyl-containing monomer unit is a (meth)acrylic acid unit, and said hydroxyl-containing unit is a hydroxyalkyl (meth)acrylate unit.

3. The resin according to claim 2, wherein a weight proportion of respective units is as follows:
   20–90 wt. % of the methyl acrylate unit;
   0.5 to 35 wt. % of the (meth)acrylic acid unit;
   0.5 to 35 wt. % of the hydroxyalkyl (meth)acrylate unit; and
   5 to 75 wt. % of another monomer unit;
   wherein said total amount of monomer unit is 100 wt. %.

4. The resin according to claim 1, further comprising a polyfunctional monomer unit, a content of which is from 0.1 to 10 wt. %; and said total amount of monomer units is 100 wt. %.

5. The resin according to claim 4, wherein said polyfunctional monomer unit is a divinylbenzene unit.

6. A resin composition, comprising:
   in a liquid medium, a resin as defined in claim 1 and an adhesive component or film-forming component.

7. The resin composition according to claim 6, wherein a total content of solids ranges from 5 to 75 wt. % based on 100 wt. % of said composition; and wherein weight proportions of respective units are as follows:

10 to 90 wt. % of resin
   1 to 85 wt. % of adhesive component or film forming component and
   0.5 to 20 wt. % of other components;
   wherein said weight proportions of said units are based on 100 wt. % of said solids.

8. The resin composition according to claim 6, further comprising a crosslinking agent.

9. The resin composition according to claim 6, or 8, further comprising a coloring agent.

10. A method of coating an article, which comprises: forming a coating on a surface of said article with a resin composition as defined in claim 9, and subsequent to use of said article, treating said article with alkaline water to saponify methyl acrylate in said coating such that said coating is caused to swell, and then removing said coating so swollen from said article.

11. The method according to claim 10, wherein said coating has been crosslinked with a cross-linking agent.

12. A method of coating an article, which comprises: forming a coating on a surface of said article with a resin composition as defined in claims 6 or 8, printing a surface of said coating or adhering a sheet-shaped print to said surface of said coating, and subsequent to use of said article, treating said article with alkaline water to saponify methyl acrylate in said coating such that said coating is caused to swell, and then removing, from said article, said coating so swollen and said printed coating or sheet-shaped print.

13. The method according to claim 12, wherein said coating has been crosslinked with a crosslinking agent.

14. The method according to claim 11, wherein said crosslinking agent is an amino resin, a polyisocyanate compound or glutaraldehyde.

15. The recycling method according to claim 10, wherein said article is a plastic product or glass product.

16. The recycling method according to claim 13, wherein said crosslinking agent is an amino resin, a polyisocyanate compound or glutaraldehyde.

17. The method according to claim 12, wherein said article is a plastic product or glass product.

18. The resin according to claim 1, wherein said polymerizable groups are methacryloyl groups.

* * * * *